United States Patent [19]
Ravipati

[11] Patent Number: 5,838,521
[45] Date of Patent: Nov. 17, 1998

[54] MAGNETORESISTIVE TRANSDUCER HAVING LAMINATED MAGNETIC SHIELDS

[75] Inventor: Durga P. Ravipati, Saratoga, Calif.

[73] Assignee: Read-Rite Corporation, Milpitas, Calif.

[21] Appl. No.: 423,078

[22] Filed: Apr. 17, 1995

[51] Int. Cl.$^6$ ........................................................ G11B 5/39
[52] U.S. Cl. ................................................................ 360/113
[58] Field of Search ...................................... 360/113, 126

[56] References Cited

U.S. PATENT DOCUMENTS

| | | | |
|---|---|---|---|
| 5,032,945 | 7/1991 | Argyle et al. ........................... | 360/126 |
| 5,438,470 | 8/1995 | Ravipati et al. ........................ | 360/113 |

FOREIGN PATENT DOCUMENTS

| | | | |
|---|---|---|---|
| 5-94605 | 4/1993 | Japan ...................................... | 360/113 |
| 6-203333 | 7/1994 | Japan ...................................... | 360/113 |

*Primary Examiner*—Robert S. Tupper
*Attorney, Agent, or Firm*—Nathan N. Kallman

[57] ABSTRACT

A magnetoresistive read transducer includes a magnetoresistive layer that is sandwiched between a pair of laminated magnetic shields. Each laminated magnetic shield includes at least two layers of ferromagnetic material spaced by a layer of non-magnetic material. The respective magnetization vectors of uniaxial anisotropy in the shields are opposite to each other. The magnetization vectors in the two ferromagnetic layers form a closed magnetic path which is substantially perpendicular to the surfaces of the layer interfaces. The magnetic pattern thus formed is highly stable, so that the magnetoresistive layer generates output signals with low Barkhausen noise and further allows the transducer to interact with recording media having high linear recording density.

14 Claims, 5 Drawing Sheets

MAGNETORESISTIVE TRANSDUCER HAVING LAMINATED MAGNETIC SHIELDS

CROSS-REFERENCE TO COPENDING PATENT APPLICATION

Copending U.S. patent application Ser. No. 08/242,457, filed on May 13, 1994, now U.S. Pat. No. 5,438,470, on behalf of Ravipati et al., and assigned to the same assignee, discloses a magnetoresistive transducer having low lead resistance and small lateral dimension. The subject matter of the copending application is incorporated herein by reference.

FIELD OF THE INVENTION

This invention relates to thin-film magnetic transducers capable of reading recorded information stored on magnetic media.

BACKGROUND OF THE INVENTION

Magnetic media in the form of tapes or disks have been widely used for storage of data. Magnetic transducers are commonly employed for interacting with the magnetic media to transduce data. A typical magnetic transducer includes an inductive coil sandwiched between a pair of magnetic poles. As arranged, the two magnetic poles act as magnetic flux guides for the inductive coil. During the read mode for example, magnetic flux emanating from a recording medium is intercepted by the magnetic poles. The intercepted magnetic flux flows along the poles and induces electrical current in the inductive coil. The induced current in the coil corresponds to the data signals stored in the recording medium.

One problem that exists is that the operational range of the aforementioned type of transducer is limited. As is well known in the art, an inductive coil develops a back electromotive force (EMF) opposing any current changes through the coil (Lenz's law). Likewise, in a magnetic transducer with an inductive coil, changes of current induced by the corresponding magnetic flux changes are accordingly opposed. This inherent behavior of an inductive coil negatively affects the operational speed of a transducer. As a consequence, a transducer with an inductive coil is incapable of operating at high frequency ranges. Translating in practical terms, a magnetic transducer relying on an inductive coil cannot interact with recording media having high linear recording densities.

To rectify the aforementioned problem, various components have been proposed to substitute for the inductive coil in transducer design. One type of transducer of present interest is the magnetoresistive transducer which is formed with a magnetoresistive element that is sandwiched between a pair of magnetic shields. During the read mode, a DC bias current is passed through the magnetoresistive element. Magnetic flux emanating from a recording medium is intercepted by the magnetic shields and is directed to the magnetoresistive element which changes in resistivity. Changes in resistivity accordingly alter the current that corresponds to the information read out from the recording medium.

The advantage of implementing a magnetoresistive element in a magnetic read transducer is multi-fold. To begin with, modern day thin-film technology allows a magnetoresistive transducer to be fabricated at a miniaturized scale. As a result, the magnetoresistive transducer can read information on a recording medium with much narrower track widths. More importantly, the magnetoresistive element changes resistivity almost instantaneously in response to external magnetic flux change. The consequential benefit is that a magnetoresistive transducer can read out information from a recording medium at extremely fast speed. Accordingly, a higher linear recording density per track on the recording medium is made possible.

Advantageous as it appears, a conventional magnetoresistive transducer still cannot operate up to its full potential. One of the main restraints is the limited capacity of the magnetic shields guiding the magnetic flux onto the magnetoresistive element. Reference is now directed to FIG. 1 which illustrates a typical conventional magnetoresistive transducer signified by reference numeral 2. Disposed between the two magnetic shields 4 and 6 is a multilayer structure 8, which includes a magnetoresistive layer 10, electrical conductors 12 and 14, and bias layers. Each magnetic shield 4 or 6 assumes a magnetic domain pattern 16 at its quiescent state. The quiescent magnetic domain pattern 16 is defined by the domain walls 22 and is illustrated with dashed lines. In general, the magnetic domain pattern 16 is partitioned into an orderly manner with main domains 18 surrounded by closure domains 20. The formation of an equilibrium magnetic domain pattern 16 in the magnetic shield 4 depends on a variety of factors. Examples of the various factors are the geometrical shape, thickness, granular defects, temperature and mechanical stress of the magnetic shield 4 or 6. The underlying principle is that the final domain pattern always stabilizes itself to achieve the lowest magnetic energy state. Ideally, during the read mode, the magnetic pattern 16 accommodates the flux changes intercepted by the magnetic shield 4 or 6 by rotating the directions of magnetization in the main domains 18 from 24A and 26A to 24B and 26B, respectively, as shown in FIG. 1. Very often, the domain walls merge together or split apart in response to changes in one of the above mentioned factors. For example, due to prolonged operation, thermal stress is induced in the transducer 2. In response, the domain pattern 16 is most likely altered into a different pattern, such as pattern 28 shown in FIG. 2. Upon the decay of the thermal distress, the deviated domain pattern 28 changes relatively sluggishly in an effort to recover itself to the original pattern 16. The constant splitting or merging of domain walls 22 correspondingly induces noisy current in the magnetoresistive layer 10, and this noisy current is known as Barkhausen noise in the transducer 2. The occurrence of Barkhausen noise during the read process may result in erroneous data read-out and is therefore detrimental to the performance of a magnetic head. To aggravate the situation further, operating in the high frequency range, flux intercepted by the shields 4 and 6 is significantly consumed to generate eddy current 23 (FIG. 2) which further degrades the signal-to-noise ratio and renders the transducer 2 inoperable.

Present day electronic products are built with ever smaller geometries. As a result, recording media are designed with narrower track widths and capability of higher linear recording density. Transducers with the aforementioned shortfalls are incapable of interacting with such recording media. There is a long-felt and increasing need for a magnetic transducer with better performance.

SUMMARY OF THE INVENTION

An object of the invention is to provide a high frequency magnetoresistive read transducer capable of interacting with recording media having narrow track widths and dense linear recording density.

In one embodiment of the invention, a magnetoresistive layer is sandwiched between a pair of laminated magnetic shields. Each laminated magnetic shield includes at least two layers of ferromagnetic material spaced by a layer of non-magnetic material. Furthermore, the respective magnetization vectors of uniaxial anisotropy in the shields are substantially opposite to each other. As arranged, the magnetization vectors in the two ferromagnetic layers form a closed magnetic path which is substantially perpendicular to the surfaces of the layer interfaces. The magnetic pattern thus formed is highly stable, thereby avails the magnetoresistive layer to generate output signals with low Barkhausen noise and further allows the transducer to interact with recording media capable of high linear recording density.

In another embodiment of the invention, a magnetoresistive layer having direct electrical lead contacts at both ends is interposed between a pair of the above mentioned shields. A transducer with a substantial narrower lateral dimension can thus be built. The consequential benefits are the transducer of this embodiment is capable of interacting with recording media with still finer track widths and denser linear recording density.

These and other advantages, features, and objects of the present invention will be apparent to those skilled in the art from the following detailed description, taken together with the accompanying drawings, in which like reference numerals refer to like parts.

DETAILED DESCRIPTION OF THE INVENTION

Figure 3:
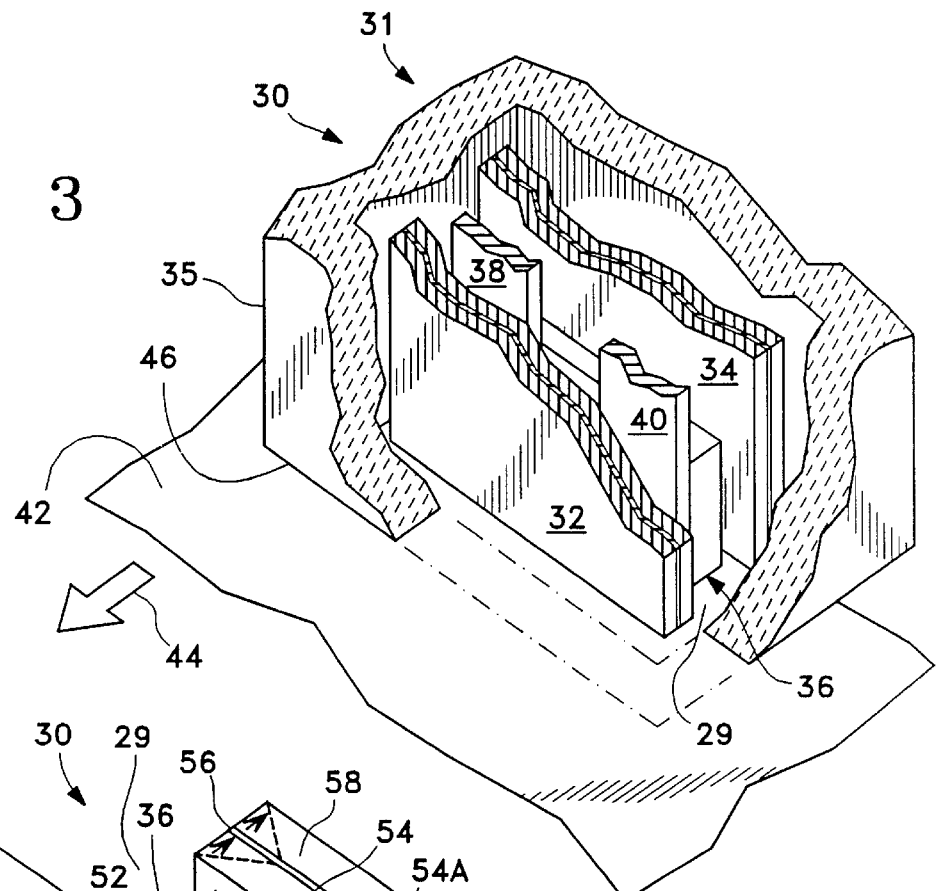
FIG. 3 is a fragmentary view of a first embodiment of the present invention.

Reference is now made to FIG. 3 which is a fragmentary view of a first embodiment of the invention. The magnetoresistive transducer of this embodiment is signified by reference numeral 30, which is part of a magnetic head 31 having a protective shell 35. The protective shell 35 is preferably made of a non-magnetic and non-conductive material, such as ceramic. Inside the protective shell 35 are two magnetic shields 32 and 34 encompassing a tri-layer structure 36 that includes a magnetoresistive element. The magnetic shields 32 and 34 also define a read gap 29 therebetween. Sensed signal is conveyed to a sense amplifier (not shown) via a pair of electrical conductors 38 and 40 connected to the tri-layer structure 36.

Figure 6:
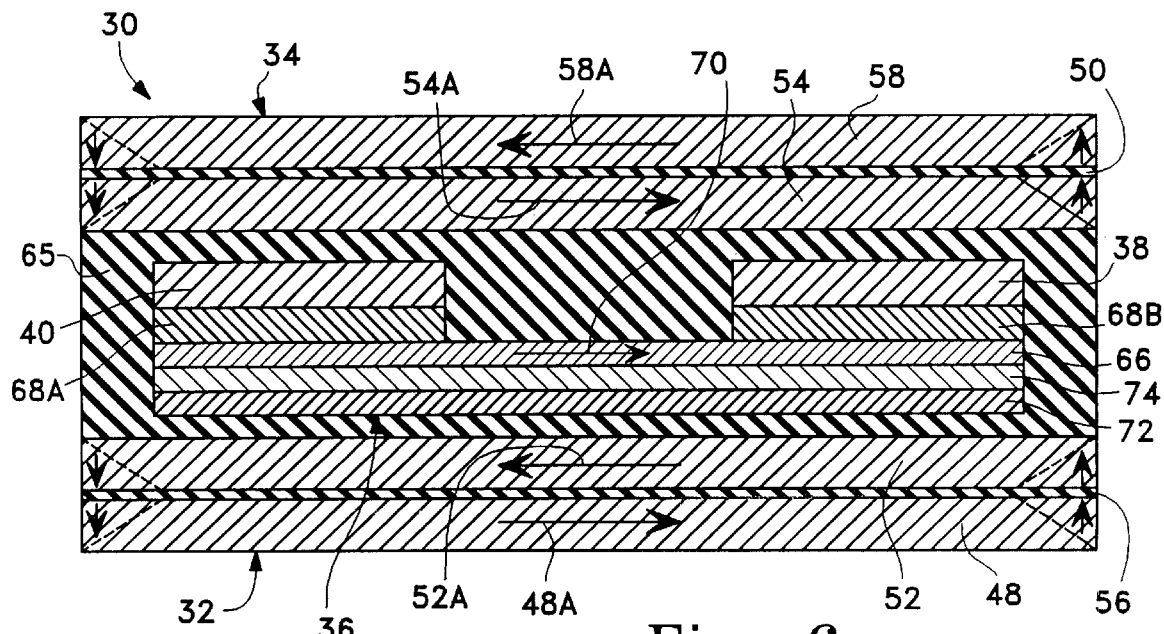
FIG. 6 is a cross-sectional side view of the first embodiment of the invention taken along line 6—6 of FIG. 4.

During the read mode, a recording medium 42, such as a magnetic disk, moves adjacent to the air bearing surface 46 of the magnetic head 31 in a direction 44, for example. As is well known the aerodynamics associated with the air bearing surface 46 and moving disk 42 causes the magnetic head 31 to fly relative to the medium. Information stored on the recording medium 42 is sensed by the transducer 30 as changes of magnetic flux through the read gap 29. These magnetic flux changes are converted by the transducer 32 into electrical signals. Not shown in FIG. 3 but shown in FIG. 6 is the insulating dielectric between shields 32 and 34.

Figure 4:
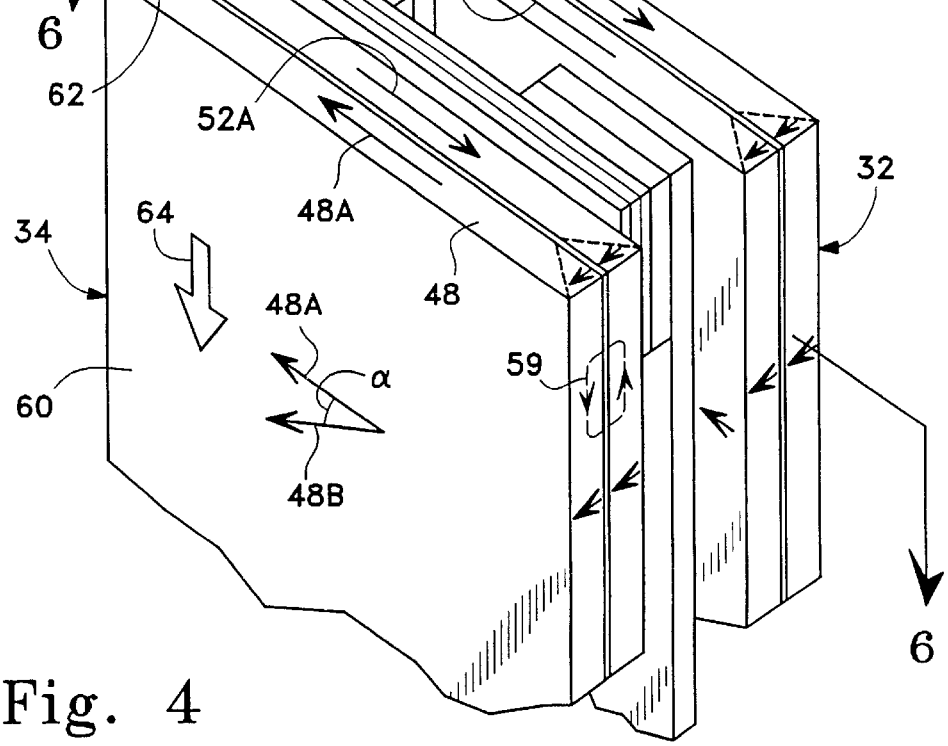
FIG. 4 is a perspective view of the embodiment shown in FIG. 3 viewed from the air bearing surface thereof.

Reference is now directed to FIG. 4 which is a perspective view of the first embodiment of the invention viewed from the air bearing surface of the transducer 30 and having the read gap 29 facing upwardly, thereby showing all the relevant components of the transducer 30 to aid in the explanation.

In this and subsequent embodiments, the magnetic shields are formed of layers of ferromagnetic material laminated by layers of non-magnetic material. For example, the magnetic shield 34 comprises a non-magnetic layer 50 spaced between magnetic layers 48 and 52. Similarly, the magnetic shield 32 includes a non-magnetic layer 56 sandwiched between magnetic layers 54 and 58. The magnetic layers 48, 52, 54 and 58 are preferably made of a ferromagnetic material having a low coercive force and high permeability. In this embodiment, layers 48, 52, 54 and 58 are formed of Permalloy (NiFe). Non-magnetic layers 50 and 56 can be a non-magnetic metal, such as tantalum. Alternatively, non-magnetic layers 50 and 56 can also be non-conducting, which provides another advantage of curtailing eddy current 59 through the lamination. The eddy current 59 arises mainly in response to magnetic flux changes intercepted by the shields 32 and 34 during normal operation in accordance with the Lenz's law. In this embodiment, non-magnetic layers 50 and 56 are both non-magnetic and non-conducting and are preferably formed of Alumina ($Al_2O_3$).

It should be noted that with the magnetic shields laminated as described, a single domain pattern coextensive with the planar surface 60 of the magnetic shield can be made possible. For example, in the magnetic shield 34, each of the ferromagnetic layers 48 and 52 has its own uniaxial anisotropy. The direction of the uniaxial anisotropies in layers 48 and 52, represented by magnetization vectors 48A and 52A, respectively, are substantially opposite to each other. In essence, magnetization vectors 48A and 52A form a closed magnetic path circulating through the non-magnetic layer 50. Furthermore, the magnetic path is perpendicular to the planar surface 60 of magnetic shield 34. A magnetic pattern is thus formed and is shown as pattern 62 in FIG. 4. The magnetic energy state of the magnetic pattern 62 is highly stable and can withstand reasonably adverse conditions during normal operations.

The magnetic shields 34 and 32 respond to magnetic flux by rotating the magnetization vectors 48A and 54A, without altering the overall magnetic pattern 62. For example, during the read mode, magnetic flux emanating from the recording medium 42 flows in the direction 64. In response, the direction of magnetization rotates through an angle a from magnetization vector 48A to magnetization vector 48B. There are no splitting or merging of domain walls as experienced by shields of most prior art transducers. The consequential benefits are substantial reduction in Barkhausen noise experienced by the transducer 30, which in turn generates outputs with high signal-to-noise ratio. Above all, the transducer 30 can operate at high frequency ranges free of any degradation due to operating speed.

It should be noted that lamination of ferromagnetic layers by interposing non-magnetic layers has been studied in the past. For example, in the paper by S. R. Herd et al., entitled "Magnetic Domain Structures In Multilayered NiFe Films", Appl. Physics., Vol. 50, No. 3, page 2384 (1979), the effect of lamination is found to lower the coercivities. In another paper published by Russak et al., entitled "Magnetic and Microstructure of Sputtered $Ni_{80}Fe_{20}/SiO_2$ Multilayer Films" IEEE Transactions on Magnetic, Vol. 26, No. 5, September 1990, lamination of ferromagnetic layers by non-magnetic layers is found to exhibit a single domain pattern coextensive with the planar surface of the composite structure, via experimentation and observation through a Kerr microscope. In U.S. Pat. No. 5,106,837, to Mallary, entitled "Laminated Poles for Magnetic Heads", issued on Apr. 28, 1992, a laminated pole piece for a recording head is disclosed. However, the pole piece is installed for guiding magnetic flux for an inductive coil. No provisions are mentioned for improving the linear recording density. In fact even if single-domain patterns can be maintained in the pole pieces, the coil structure still cannot operate at high frequency ranges due to the inherent back EMF effects associated with a coil as mentioned above. Normally, the pole piece assumes a geometrical shape of having a narrow neck portion attached to a wide body portion. The wide body portions of the two pole pieces are laid above and underneath the coil, interposed with dielectric material. The pole pieces normally do not have good step-coverage encompassing the coil, due mainly to the geometrical irregularity and the large surface area of the inductive coil. That is, rather than flat surfaces, the pole pieces undulate irregularly into three dimensional space. It is doubtful whether a single domain pattern can be sustained in such a geometrical irregularity.

The transducers of the present invention are free of the aforementioned restraints, particularly in that the operational speed is neither hampered by the transducer elements nor the shields. The transducers of the present invention are capable of interacting with recording media with high linear data density, in addition to the advantages of reduction in Barkhausen noise and the capability of reading data tracks with narrow widths.

Figure 1:
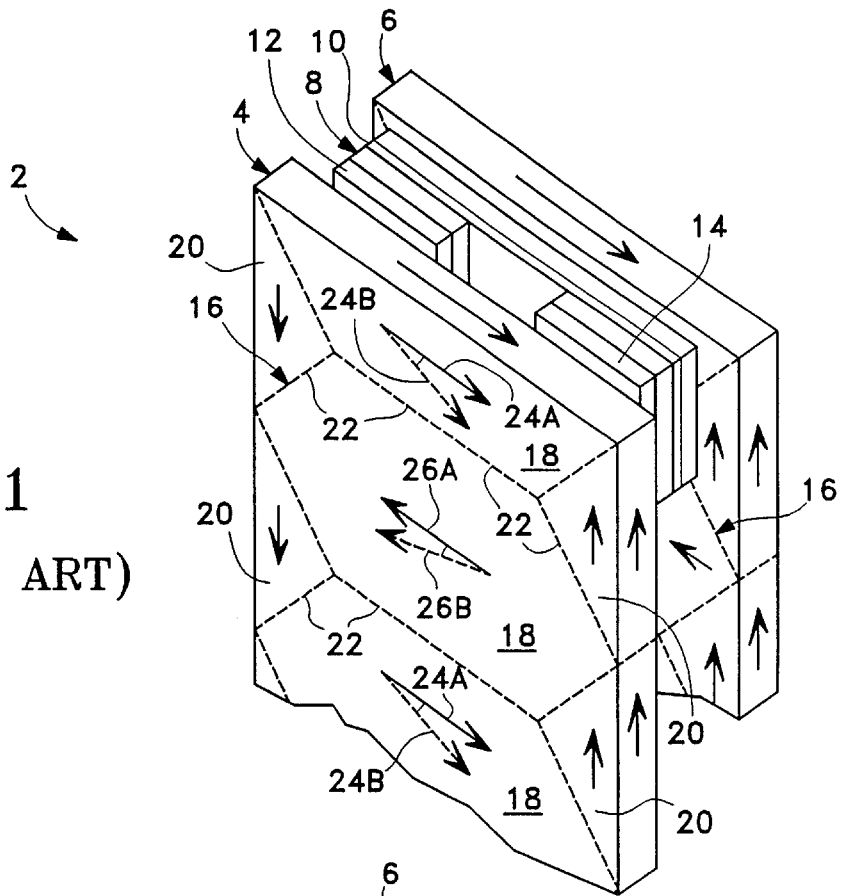
FIG. 1 is an isometric view of a prior art magnetoresistive transducer having quiescent-state magnetic domain patterns in the magnetic shields.
Figure 2:
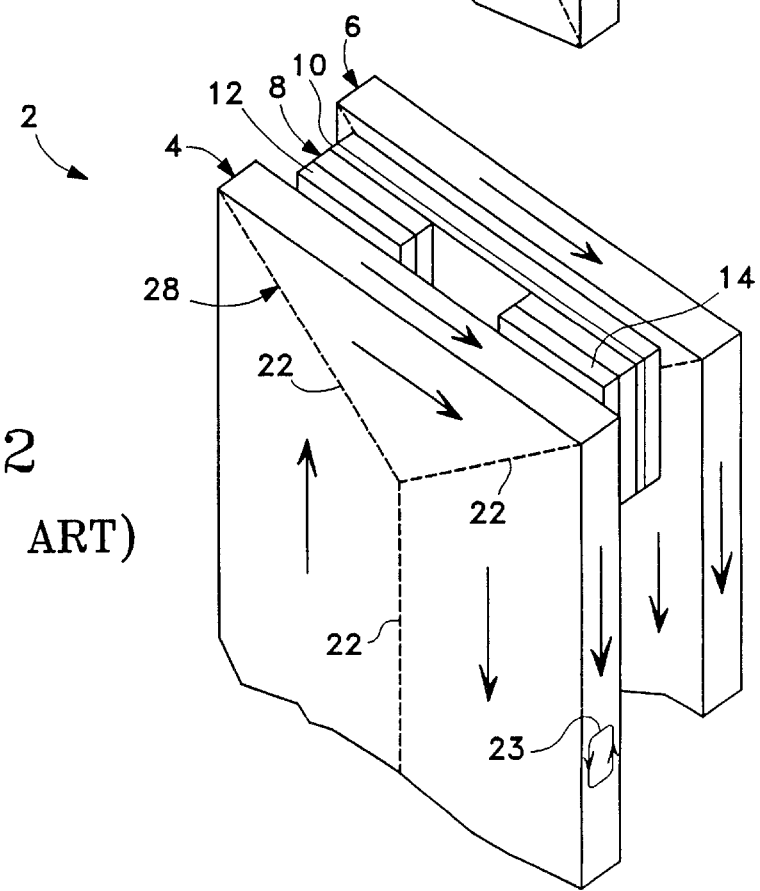
FIG. 2 is an isometric view of the prior art magnetoresistive transducer of FIG. 1 having an altered magnetic domain pattern during normal operation.
Figure 5:
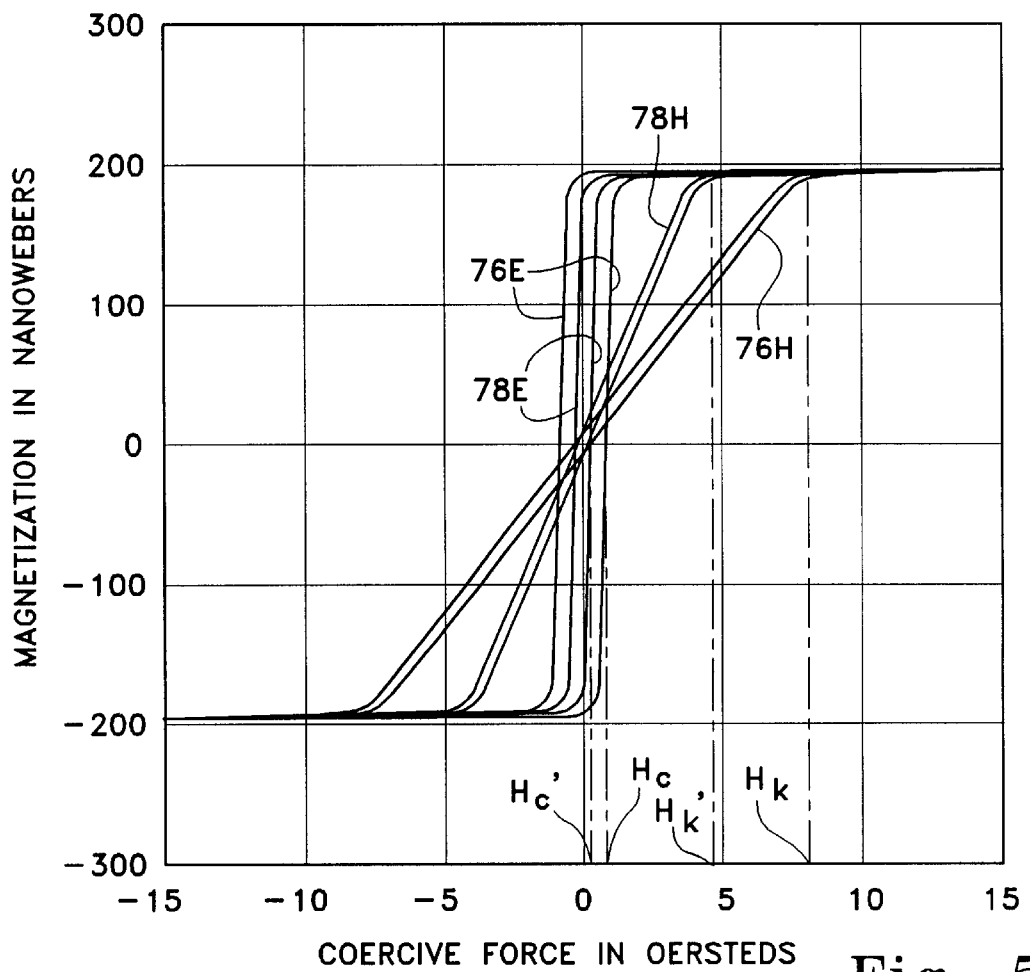
FIG. 5 is a graphical representation of the magnetic behaviors of a laminated magnetic shield and an unlaminated magnetic shield.

This synergetic effect is further investigated by means of a BH Loop Tracer manufactured by SHB Instruments, located in Santa Barbara, Calif. Samples of a laminated shield and an unlaminated shield of equal dimensions were scanned in the BH looper. Shown in FIG. 5 are the hysteresis characteristics of the two shield samples highlighting the different magnetic behaviors. Hysteresis curves 76E and 76H represent the magnetic property of an unlaminated shield, such as shields 4 and 6 shown in FIGS. 1 and 2, along the easy and hard axes, respectively. The curve 76E has a coercive force $H_c$ while the curve 76H is characterized by an anisotropy field $H_k$. Similarly, hysteresis curves 78E and 78H represent the magnetic property of a laminated shield, such as shields 32 and 34 shown in FIG. 4, along the easy and hard axes, respectively. The curve 78E has a coercive force $H_c'$ while the curve 78H has an anisotropy field $H_k'$. As can be seen in FIG. 5, the coercive force $H_c'$ of the laminated shield is smaller than coercive force $H_c$ of the unlaminated shield. It takes less magnetic force to alter the magnetic polarity of a laminated shield than an unlaminated shield. As a consequence, a laminated shield is more responsive to external magnetic flux changes. Moreover, the anisotropy field $H_k'$ of the laminated shield is smaller than the anisotropy field $H_k$ of the unlaminated shield. The lower $H_k$ increases the permeability of the shield and thereby improves head efficiency. All these attributes contribute to the improved use of a laminated shield for high speed operations.

FIG. 6 is a cross-sectional side view taken along line 6—6 of FIG. 4. As shown, the tri-layer structure 36 is separated from the magnetic shields 34 and 32 by an insulating dielectric 65. The insulating dielectric 65 is preferably non-magnetic and non-conducting. In this embodiment, the insulating dielectric 65 is formed of alumina. The tri-layer structure 36 includes a magnetoresistive layer 66 formed of soft magnetic material having a low coercive force and a high permeability. In this embodiment, the magnetoresistive layer 66 is made of Permalloy. Disposed at the end regions of the magnetoresistive layer 66 and in contact therewith, are hard magnetic bias layers 68A and 68B, which provide a longitudinally magnetic bias 70 to align the magnetoresistive layer 66 in a single domain state for the purpose of Barkhausen noise reduction. Moreover, for the magnetoresistive layer 66 to operate within a linear operating region, another bias, called the transverse magnetic bias, must also be applied to layer 66. The Soft Adjacent Layer (SAL) 72 disposed close to the magnetoresistive layer 66 fulfills this function. The soft adjacent layer 72 and the magnetoresistive layer 66 are spaced by a spacer layer 74. In this embodiment, the soft adjacent layer 72 is formed of an alloy which includes nickel, iron, and rhodium (NiFeRh). The spacer layer 74 comprises tantalum (Ta).

The transducer 30 can be fabricated through conventional thin-film processes and no further elaboration is needed. Ferromagnetic layers 48, 52, 54 and 58 are formed by conventional sputtering to a thickness of between 300–20,000 Å (Angstroms). During the sputtering process, the target substrate must be appropriately biased magnetically such that the directions of uniaxial anisotropy 58A, 54A, 52A and 48A in layers 58, 54, 52 and 48, respectively, are properly oriented. Non-magnetic layers 50 and 56 are sputtered to a thickness of between 10–70 Å. Moreover, magnetoresistive layer 66, spacer layer 74 and soft adjacent layer 72 can be formed through the conventional deposition process to the thickness ranges of 200–300 Å, 100–200 Å and 200–250 Å, respectively.

Figure 7:
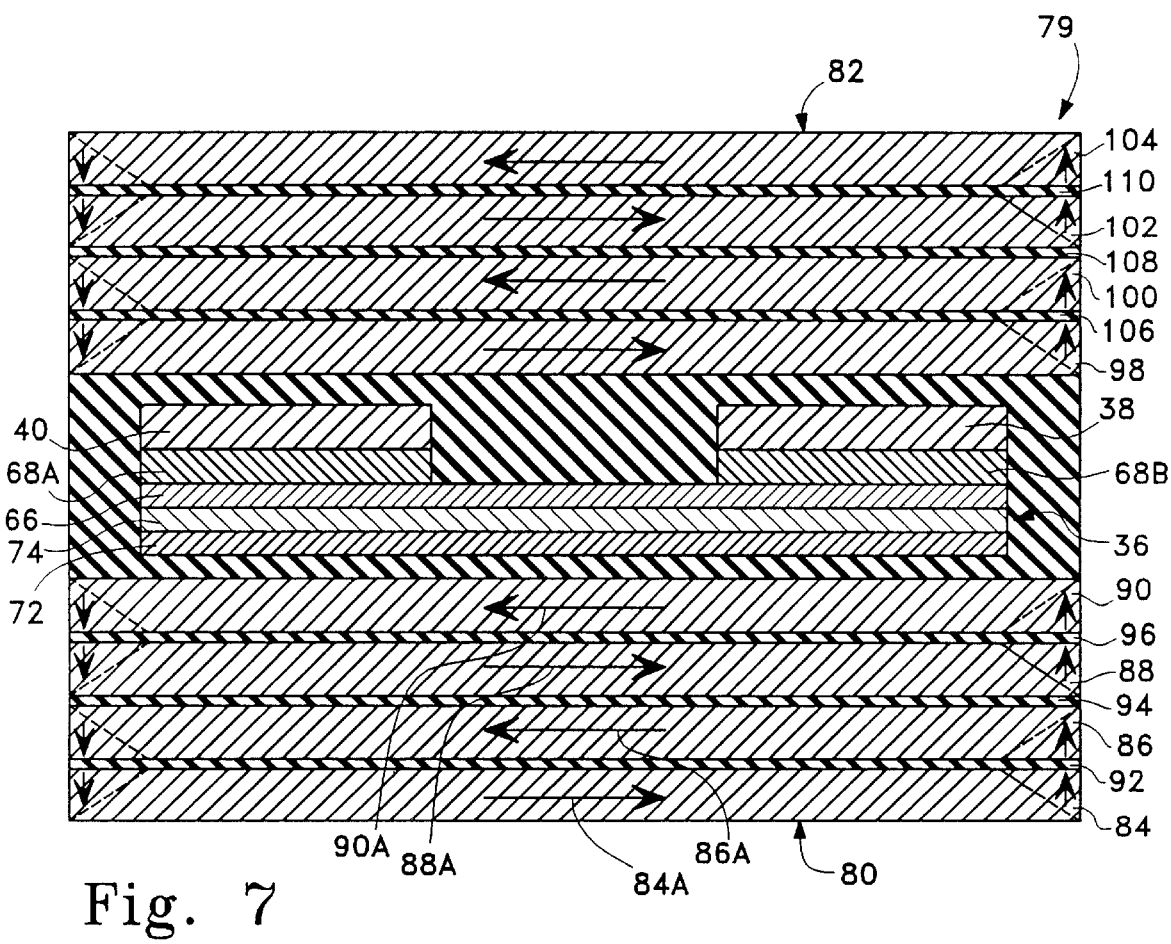
FIG. 7 is a cross-sectional side view of a second embodiment of the invention.

It should be noted that each of the laminated shields 32 and 34 does not restrict itself to only two layers of ferromagnetic material spaced by a non-magnetic material. Shown in FIG. 7 is a third embodiment of the invention. In this embodiment, the transducer 79 includes magnetic shields 80 and 82. Each of the shields 80 and 82 includes a plurality of ferromagnetic material spaced by layers of non-magnetic material. For example, the shield 80 comprises ferromagnetic material layers 84, 86, 88 and 90 interposed by the respective non-magnetic layers 92, 94 and 96. In a similar manner, the shield 82 comprises ferromagnetic layers 98, 100, 102 and 104 interposed by the respective non-magnetic layers 106, 108 and 110. There are two closed magnetic paths in each of the shields 80 and 82. For example, in shield 80, magnetization vectors 84A and 86A in the respective layers 84 and 86, in association with the magnetization vectors of the closure domains, form one closed magnetic path. Similarly, magnetization vectors 88A and 90A in the respective layers 88 and 90, in association with the magnetization vectors of the closure domains form another closed magnetic path. The advantages of the transducer 79 of this embodiment in comparison with the transducer 30 of the previous embodiment is that the additional laminations further curtail the occurrences of eddy current.

Figure 8:
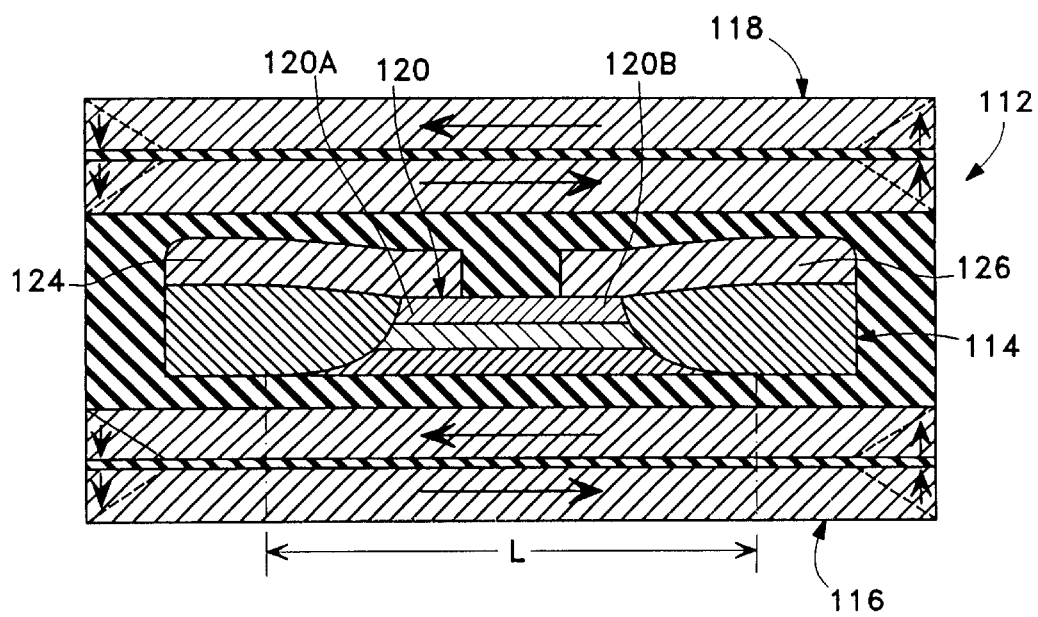
FIG. 8 is a cross-sectional side view of a third embodiment of the invention.

Shown in FIG. 8 is a third embodiment of the invention which is suitable for applications that demand extra fine track widths and dense linear recording density. The transducer 112 comprises a pair of laminated magnetic shields 116 and 118 encompassing a tri-layer structure 114. The distinguishable feature of tri-layer structure 114 is a pair of electrical conductors 124 and 126 in direct contact with the respective end regions 120A and 120B of the magnetoresistive layer 120. The advantage of this embodiment is tri-layer structure 112 can be designed with an even narrower lateral dimension L, which in turn allows the transducer 112 to interact with recording media having much narrower track widths. The design and principles of operation of the tri-layer structure 114 is disclosed in the referenced copending application. Transducer 112 is suitable for miniaturized electronic systems that require high performance.

Figure 9:
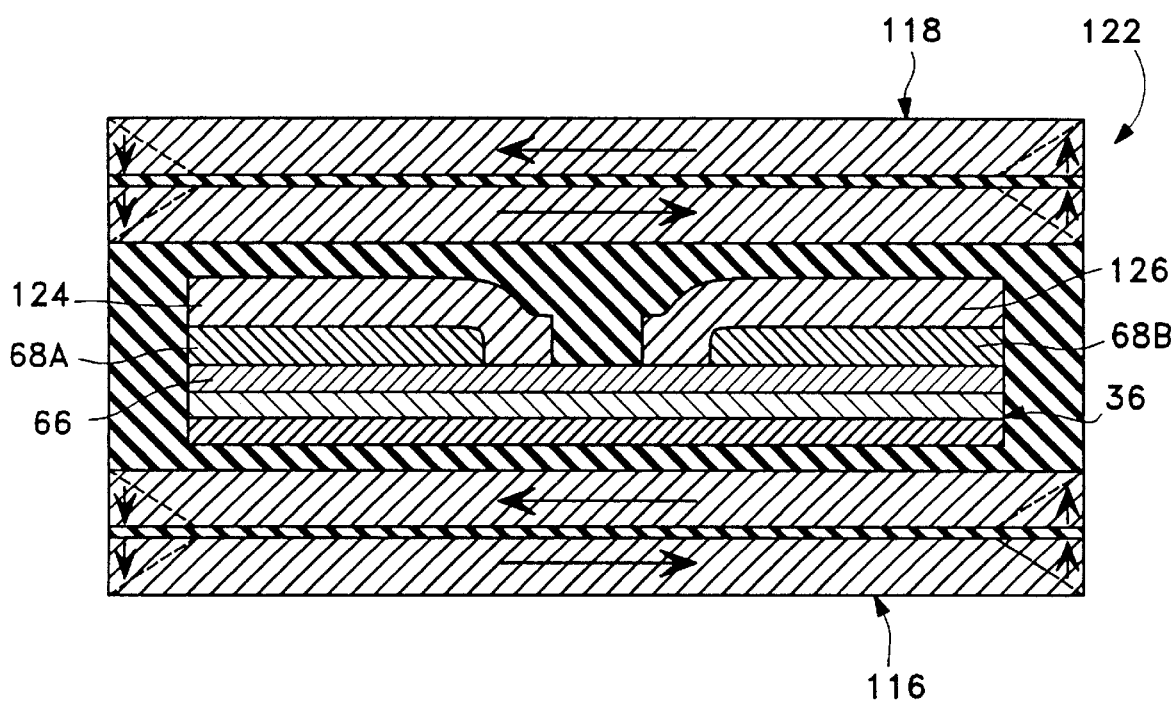
FIG. 9 is a cross-sectional side view of a fourth embodiment of the invention.

Finally, other variations are possible within the scope of the invention. In FIG. 9, another embodiment of the invention incorporates a transducer 122 includes a pair of magnetic shields 116 and 118 encompassing the tri-layer structure 36. Electrical conductors 124 and 126 are in contact with the end regions of the magnetoresistive layer 66, in a similar manner as found in the transducer 112 shown in FIG. 8. However, the hard magnetic layers 68A and 68B are disposed atop the magnetoresistive layer 66, instead of abutting therewith.

The transducer of the present invention achieves its main objective by removing the restraints commonly associated with the prior art magnetic shields, thereby allowing the magnetoresistive element to operate at its full potential.

For all the embodiments, the materials used need not be restricted to those described and illustrated. Furthermore, each of the magnetic shields can be laminated to be formed with more than four layers of ferromagnetic material. In addition, the laminated layers in each of the laminated shields need not be of the same type of ferromagnetic material, and further need not assume the same number of layers as the other shield within the same transducer. These and other changes in form and detail may be made therein without departing from the scope and spirit of the invention as defined by the appended claims.

What is claimed is:

1. A thin-film magnetoresistive transducer having first and second ends defining the width of said transducer comprising:
   a tri-layer magnetoresistive structure layer formed of ferromagnetic material having a width less than said width of said transducer; and
   a pair of laminated magnetic shields, each having a width substantially equal to the width of said transducer, each of said magnetic shields being formed of at least two layers of ferromagnetic material spaced by a non-magnetic layer with one of said layers of ferromagnetic material having a direction of uniaxial anisotropy substantially opposite to the direction of uniaxial anisotropy of the other of said layers of ferromagnetic material, said layers of ferromagnetic material and said non-magnetic layer being co-extensive and of the same width, said magnetoresistive layer being sandwiched between said pair of laminated magnetic shields.

2. The thin-film magnetoresistive transducer as set forth in claim 1 wherein said layers of ferromagnetic material comprise Permalloy.

3. The thin-film magnetoresistive transducer as set forth in claim 1 wherein said non-magnetic layer comprises tantalum.

4. The thin-film magnetoresistive transducer as set forth in claim 1 wherein said non-magnetic layer is non-conducting.

5. The thin-film magnetoresistive transducer as set forth in claim 1 wherein said non-magnetic layer comprises alumina.

6. The thin-film magnetoresistive transducer as set forth in claim 1 wherein said magnetoresistive structure includes end regions separated by an active region, and wherein said transducer further comprises first and second electrical conductors, each of said electrical conductors being disposed in contact with one of said end regions of said magnetoresistive layer, such that said first and second electrical conductors and said magnetoresistive layer form a direct electrical path.

7. The thin-film magnetoresistive transducer as set forth in claim 6 further comprising first and second hard-magnetic layers, each of said hard-magnetic layers being disposed between one of said end regions of said magnetoresistive structure and one of said electrical leads, said hard-magnetic layers cooperatively providing a magnetic bias to said magnetoresistive structure.

8. The thin-film magnetoresistive transducer as set forth in claim 7, each of said hard-magnetic layers being disposed in abutting contact with one of said end regions of said magnetoresistive structure.

9. The thin-film magnetoresistive transducer as set forth in claim 2 wherein each of said hard-magnetic layers is disposed in abutting contact with one of said end regions of said magnetoresistive structure.

10. A thin-film magnetoresistive transducer having first and second ends defining the width of said transducer comprising:
    a tri-layer magnetoresistive structure layer formed of ferromagnetic material having a width less than said width of said transducer; and
    a first laminated magnetic shield having a major planar surface and being disposed proximal to and separated from said magnetoresistive structure, said laminated magnetic shield further including a first layer of ferromagnetic material having a first direction of uniaxial anisotropy, and a second layer of ferromagnetic material having a second direction of uniaxial anisotropy, wherein said first and second directions of uniaxial anisotropy are substantially opposite to each other, whereby a closed magnetic path is formed substantially perpendicular to said major planar surface, said first and second layers of ferromagnetic material being spaced by a non-magnetic layer, said first laminated magnetic shield further comprising third and fourth layers of ferromagnetic material spaced by non-magnetic layers, said third and fourth layers of ferromagnetic material having third and fourth directions of uniaxial anisotropy substantially the same as said first and second directions of uniaxial anisotropy, respectively; and
    a second laminated magnetic shield having magnetic characteristics substantially the same as said first laminated magnetic shield, said magnetoresistive structure being disposed between said first and second laminated magnetic shields through an insulating dielectric;
    said layers of ferromagnetic material and said non-magnetic layers being co-extensive and of the same width as said transducer.

11. The thin-film magnetoresistive transducer as set forth in claim 10 wherein said magnetoresistive structure includes end regions separated by an active region, and wherein said transducer further comprises first and second electrical conductors each of said electrical conductors being disposed in contact with one of said end regions of said magnetoresistive structure, such that said first and second electrical conductors and said magnetoresistive structure form a direct electrical path.

12. The thin-film magnetoresistive transducer as set forth in claim 11 further comprising first and second hard-magnetic layers, each of said hard-magnetic layers being disposed in contact with one of said end regions of said magnetoresistive structure, said hard-magnetic layers providing a magnetic bias to said magnetoresistive structure.

13. A thin-film magnetoresistive transducer for converting changes in magnetic flux sensed from a recording medium to electrical signals, wherein said transducer has first and second ends defining the width of said transducer comprising:

- a magnetoresistive layer formed of ferromagnetic material, and having a width less than said width of said transducer; and
- first and second magnetic shields, each of said magnetic shields including at least two layers of ferromagnetic material having substantially opposite directions of uniaxial anisotropy spaced by a layer of nonmagnetic material, said magnetoresistive layer being disposed separately and proximally between said first and second magnetic shields, said layers of ferromagnetic material and said nonmagnetic layers being co-extensive and of the same width;
- first and second electrical conductors, each of said electrical conductors being disposed in contact with one of said end regions of said magnetoresistive layer, such that said first and second electrical conductors and said magnetoresistive layer form a direct electrical path; and
- first and second hard-magnetic layers, each of said hard-magnetic layers being disposed in abutting contact with one of said end regions of said magnetoresistive layer, said hard-magnetic layers providing a magnetic bias to said magnetoresistive layer.

14. The thin-film magnetoresistive transducer as set forth in claim 13 wherein said magnetic shields comprise an alloy including iron and nickel, and said non-magnetic layer comprises alumina.

* * * * *